(12) United States Patent
Nakamura et al.

(10) Patent No.: US 9,595,366 B2
(45) Date of Patent: Mar. 14, 2017

(54) CONDUCTIVE CELLULOSE-BASED RESIN COMPOSITION

(71) Applicant: DAICEL CORPORATION, Osaka-shi, Osaka (JP)

(72) Inventors: Toshikazu Nakamura, Himeji (JP); Shu Shimamoto, Tokyo (JP); Shizuka Okada, Himeji (JP)

(73) Assignee: DAICEL CORPORATION, Osaka-Shi (JP)

(*) Notice: Subject to any disclaimer, the term of this patent is extended or adjusted under 35 U.S.C. 154(b) by 0 days.

(21) Appl. No.: 14/420,288

(22) PCT Filed: Aug. 8, 2013

(86) PCT No.: PCT/JP2013/071520
§ 371 (c)(1),
(2) Date: Feb. 6, 2015

(87) PCT Pub. No.: WO2014/024977
PCT Pub. Date: Feb. 13, 2014

(65) Prior Publication Data
US 2015/0221411 A1 Aug. 6, 2015

(30) Foreign Application Priority Data
Aug. 8, 2012 (JP) ................................ 2012-175786

(51) Int. Cl.
| | | |
|---|---|---|
| *H01B 1/04* | (2006.01) | |
| *H01B 1/24* | (2006.01) | |
| *B82Y 30/00* | (2011.01) | |
| *H01M 4/583* | (2010.01) | |
| *C08L 1/10* | (2006.01) | |
| *C08K 3/04* | (2006.01) | |
| *C08K 7/24* | (2006.01) | |
| *C08J 5/18* | (2006.01) | |

(52) U.S. Cl.
CPC .................. *H01B 1/24* (2013.01); *C08J 5/18* (2013.01); *C08K 3/04* (2013.01); *C08K 7/24* (2013.01); *C08L 1/10* (2013.01); *C08J 2301/12* (2013.01); *C08K 2201/001* (2013.01); *C08K 2201/011* (2013.01)

(58) Field of Classification Search
CPC ... H01B 1/02–1/04; H01B 1/24; B82Y 30/00; B82Y 40/00
USPC ....... 252/500–511; 429/231.8; 977/734, 773, 977/788
See application file for complete search history.

(56) References Cited

U.S. PATENT DOCUMENTS

| | | | | | |
|---|---|---|---|---|---|
| 3,376,149 | A | * | 4/1968 | Gandy ...................... | C08L 1/12 106/162.72 |
| 2003/0187181 | A1 | * | 10/2003 | Sakane ..................... | B41M 5/44 528/355 |
| 2009/0001326 | A1 | * | 1/2009 | Sato ........................ | B82Y 30/00 252/511 |
| 2010/0084616 | A1 | * | 4/2010 | Brule ....................... | H01B 1/24 252/511 |
| 2011/0201731 | A1 | | 8/2011 | Korzhenko et al. | |
| 2013/0150501 | A1 | * | 6/2013 | Basu ........................ | C08L 1/12 524/41 |

FOREIGN PATENT DOCUMENTS

| | | | |
|---|---|---|---|
| CN | 102264809 A | 11/2011 | |
| JP | 43-24547 B | 10/1968 | |
| JP | 48-60934 A | 8/1973 | |
| JP | 59-18734 A | 1/1984 | |
| JP | EP 1471114 A1 * | 10/2004 | ............ B82Y 30/00 |
| JP | 2011-132457 A | 7/2011 | |
| JP | 2011-132466 A | 7/2011 | |

OTHER PUBLICATIONS

Basavaraja et al., "Electromagnetic Interference Shielding of Cellulose Triacetate/Multiwalled Carbon Nanotube Composite Films", Polymer Composites, vol. 32, No. 3, 2011 (Published online wileyonlinelibrary.com), pp. 438-444.

Blanchet et al., "Polyaniline nanotube composites: A high-resolution printable conductor", Applied Physics Letter, vol. 82, No. 8, Feb. 24, 2003, pp. 1290-1292.

Jeon et al., "High performance cellulose acetate propionate composites reinforced with exfoliated graphene", Composites: Part B, vol. 43, Issue 8, Dec. 2012, pp. 3412-3418.

Karim et al., "Synthesis and Characterization of Conducting Polythiophene/Carbon Nanotubes Composites", Journal of Polymer Science: Part A: Polymer Chemistry, vol. 44, 2006 (Published online www.interscience.wiley.com), pp. 5283-5290.

Kim et al., "Charge transport properties of composites of multiwalled carbon nanotube with metal catalyst and polymer: application to electromagnetic interference shielding", Current Applied Physics, vol. 4, 2004 (Published online Apr. 12, 2004), pp. 577-580.

(Continued)

*Primary Examiner* — Tri V Nguyen
(74) *Attorney, Agent, or Firm* — Birch, Stewart, Kolasch & Birch, LLP

(57) ABSTRACT

Problem to be Solved
It is intended to provide a conductive resin composition that exhibits high conductivity even without being supplemented with a special resin or a third component, and a molded article obtained from the resin composition.
Solution
The conductive cellulose-based resin composition of the present invention comprises (A) an aliphatic cellulose ester and (B) at least one carbon material selected from the group consisting of a single-walled carbon nanotube, a multi-walled carbon nanotube, single-layer graphene, multi-layer graphene, fullerene, and carbon black. The volume resistivity of this conductive cellulose-based resin composition is, for example, $10^{-3}$ to 20 $\Omega \cdot$cm, preferably $10^{-3}$ to 1 $\Omega \cdot$cm. The content of the carbon material (B) is, for example, 0.5 to 80% by weight of the whole conductive cellulose-based resin composition.

10 Claims, No Drawings

(56) References Cited

OTHER PUBLICATIONS

Li et al., "Cellulose Acetate/Multiwalled Carbon Nanotube Nanocomposites with Improved Mechanical, Thermal, and Electrical Properties", Journal of Applied Polymer Science, vol. 118, No. 4, Jun. 7-Nov. 15, 2010 (Published online Jun. 22, 2010), pp. 2475-2481.
Spitalsky et al., "Carbon nanotube-polymer composites: Chemistry, processing, mechanical and electrical properties", Progress in Polymer Science, vol. 35, 2010, pp. 357-401.
Zhang et al., "Surfactant-Directed Polypyrrole/CNT Nanocables: Synthesis, Characterization, and Enhanced Electrical Properties", ChemPhysChem, vol. 5, 2004, pp. 998-1002.
International Search Report (Form PCT/ISA/210) for International Application No. PCT/JP2013/071522, dated Oct. 1, 2013.
U.S. Office Action for U.S. Appl. No. 14/419,946, dated May 6, 2016.

\* cited by examiner

CONDUCTIVE CELLULOSE-BASED RESIN COMPOSITION

TECHNICAL FIELD

The present invention relates to a cellulose-based resin composition excellent in conductivity, and a molded article formed from the cellulose-based resin composition.

BACKGROUND ART

Heretofore, methods of using a general-purpose resin such as polypropylene, polyethylene, polyurethane, polycarbonate, polyvinyl chloride, polystyrene, polyethylene terephthalate, or polymethyl methacrylate as a matrix resin and dispersing a carbon material such as a carbon nanotube thereinto have been known as methods for imparting conductivity to resins (Non Patent Literature 1).

However, the conductivity of the resin composition thus obtained is generally low and poorly practical. Although it is possible that the amount of the carbon material mixed with the resin is increased in order to enhance conductivity, the problem is that the moldability of the resin composition is remarkably reduced as the amount of the carbon material is increased.

On the other hand, methods of dispersing a carbon material such as a carbon nanotube into a conductive polymer and methods of adding an iron or cobalt component together with a carbon material to a resin have been known in order to exhibit high conductivity. For example, Non Patent Literature 2 has proposed a conductive resin composition in which poly-3-hexylthiophene is mixed with a carbon nanotube. Non Patent Literature 3 has proposed a conductive resin composition in which polypyrrole is mixed with a carbon nanotube.

Non Patent Literature 4 has proposed a conductive resin composition in which polyaniline is mixed with a carbon nanotube.

Also, Non Patent Literature 5 discloses a resin composition in which polymethyl methacrylate is mixed with iron or cobalt together with a carbon nanotube. However, the resin compositions containing the conductive polymer as mentioned above generate large amounts of greenhouse gases (SOx, NOx) during incineration, in addition to high cost of raw materials, and are thus not preferred from the environmental standpoint. Furthermore, the resin compositions containing the third component such as iron or cobalt also require high cost and generate metal oxide as incineration residues.

CITATION LIST

Non Patent Literature

Non Patent Literature 1: Progress in Polymer Science, 35, (2010), 357
Non Patent Literature 2: J. Polym. Sci. Part A Polym. Chem., 2006, 44, 5283
Non Patent Literature 3: ChemPhysChem, 2004, 5, 998
Non Patent Literature 4: Appl. Phys. Lett., 2003, 82, 1290
Non Patent Literature 5: Curr. Appl. Phys., 2004, 4, 577

SUMMARY OF INVENTION

Technical Problem

An object of the present invention is to provide a conductive resin composition that exhibits high conductivity even without being supplemented with a special resin or a third component, and a molded article obtained from the resin composition.

Another object of the present invention is to provide a highly conductive resin composition that does not emit greenhouse gases (SOx, NOx) even by incineration, and a molded article obtained from the resin composition.

Solution to Problem

The present inventors have conducted diligent studies to attain the objects mentioned above and consequently completed the present invention by finding that a resin composition having high conductivity can be obtained by using an aliphatic cellulose ester as a matrix resin and dispersing a carbon material such as a carbon nanotube thereinto.

Specifically, the present invention provides a conductive cellulose-based resin composition comprising (A) an aliphatic cellulose ester and (B) at least one carbon material selected from the group consisting of a single-walled carbon nanotube, a multi-walled carbon nanotube, single-layer graphene, multi-layer graphene, fullerene, and carbon black.

The volume resistivity of the conductive cellulose-based resin composition is preferably in the range of $10^{-3}$ to 20 $\Omega \cdot cm$, more preferably in the range of $10^{-3}$ to 1 $\Omega \cdot cm$.

The content of the carbon material (B) is preferably 0.5 to 80% by weight of the whole conductive cellulose-based resin composition.

The aliphatic cellulose ester (A) may be cellulose acetate. The total degree of acetyl substitution of cellulose acetate is preferably in the range of 2.27 to 2.56. The polydispersity Mw/Mn of cellulose acetate is preferably more than 3.0 and not more than 7.5. The half height width of acetylation distribution of cellulose acetate is preferably in the range of 1.0 to 2.3%. The degree of substitution at the 6-position of cellulose acetate is preferably in the range of 0.65 to 0.85.

The carbon material (B) is preferably a single-walled carbon nanotube and/or a multi-walled carbon nanotube.

The present invention also provides a molded article formed from the conductive cellulose-based resin composition.

Advantageous Effects of Invention

The conductive cellulose-based resin composition of the present invention and the molded article thereof exhibit high conductivity even without the use of a special resin or a third component. Furthermore, the conductive cellulose-based resin composition of the present invention and the molded article emit no or few greenhouse gases (SOx, NOx) even by incineration. Moreover, because of excellent adhesiveness, the conductive cellulose-based resin composition of the present invention and the molded article are easily laminated with other materials (e.g., styrene-based resins such as polystyrene, acrylic resins such as polymethyl methacrylate, polyester-based resins such as polyethylene terephthalate, and resin materials made of ethylene vinyl alcohol or the like), and various laminates (laminate films, sheets, etc.) can be produced. In addition, the conductive cellulose-based resin composition of the present invention can be produced easily at low cost by the convenient procedures of, for example, mixing an aliphatic cellulose ester with a powder of a carbon material such as a carbon nanotube in a solvent, then casting the mixture in the form of a film, and drying the film.

DESCRIPTION OF EMBODIMENTS

The conductive cellulose-based resin composition of the present invention comprises (A) an aliphatic cellulose ester and (B) at least one carbon material selected from the group consisting of a single-walled carbon nanotube, a multi-walled carbon nanotube, single-layer graphene, multi-layer graphene, fullerene, and carbon black.

[Aliphatic Cellulose Ester (A)]

The aliphatic cellulose ester (A) is not particularly limited, and a cellulose ester in which a certain aliphatic acyl group is introduced in a hydroxy group of cellulose can be used. Examples of the aliphatic acyl group include aliphatic acyl groups (particularly, saturated aliphatic acyl groups) having approximately 1 to 10 (preferably 2 to 4) carbon atoms, such as an acetyl group, a propionyl group, a butyryl group, a pentanoyl group, and a hexanoyl group.

Examples of the aliphatic cellulose ester (A) include cellulose acetate, cellulose propionate, and cellulose butyrate. Alternatively, the aliphatic cellulose ester (A) may be mixed acylate such as cellulose acetate propionate or cellulose acetate butyrate.

Among these aliphatic cellulose esters (A), cellulose acetate is preferred, and cellulose diacetate is particularly preferred from the viewpoint of solubility in a solvent such as acetone, moldability as a resin, etc. In general, one having a total degree of acetyl substitution of not less than 2 and less than 2.6 is called cellulose diacetate. Hereinafter, cellulose acetate will be mainly described.

Among cellulose acetates, cellulose diacetate having a total degree of acetyl substitution (average degree of substitution) of 2.27 to 2.56 (cellulose diacetate having a degree of acetylation of 52.9 to 57.0) is particularly preferred in terms of conductivity when a resin composition is prepared by mixing with a carbon material. In the case where the total degree of acetyl substitution is less than 2.27 or is more than 2.56, there is a tendency that the conductivity of the resin composition is reduced.

The degree of substitution at the 6-position of cellulose acetate (cellulose diacetate, etc.) is not particularly limited and is preferably 0.65 to 0.85. In the case where the degree of substitution at the 6-position is lower than 0.65, it is more likely that: reaction is inhomogeneous; filterability is poor; and fracture elongation is reduced. In the case where the degree of substitution at the 6-position is higher than 0.85, it is more likely that fracture elongation is reduced because the hydrogen bond of the hydroxy group at the 6-position is decreased. Alternatively, in the case where the degree of substitution at the 6-position of cellulose acetate is lower than 0.65 or is higher than 0.85, there is a tendency that conductivity is reduced when a resin composition is prepared by mixing with a carbon material, and the resin composition is more likely to be fragile. The degree of substitution at the 6-position of cellulose acetate is more preferably 0.68 to 0.85, particularly preferably 0.70 to 0.85.

The respective degrees of acetyl substitution at the 2-, 3-, and 6-positions on the glucose ring of cellulose acetate (cellulose diacetate, etc.) can be measured by NMR according to the method of Tezuka (Tezuka, Carbonydr. Res. 273, 83 (1995)). Specifically, free hydroxy groups of a cellulose acetate sample are propionylated with propionic anhydride in pyridine. The resulting sample is dissolved in deuterated chloroform, and $^{13}$C-NMR spectra are measured. Carbon signals of acetyl groups appear in the order from the 2-position, via the 3-position, to the 6-position from a higher magnetic field in a region from 169 ppm to 171 ppm, and carbonyl carbon signals of propionyl groups appear in the same order in a region from 172 ppm to 174 ppm. The respective degrees of acetyl substitution at the 2-, 3-, and 6-positions on the glucose ring of the original cellulose acetate can be determined from the abundance ratios between acetyl and propionyl groups at the corresponding positions. These degrees of acetyl substitution can also be determined by $^{1}$H-NMR, in addition to $^{13}$C-NMR.

The most general method for determining the average degree of substitution of cellulose acetate is the method for measuring the degree of acetylation prescribed in ASTM-D-817-91 (Testing methods for cellulose acetate, etc.). The degree of acetylation (amount of bound acetic acid) determined according to ASTM may be converted into the total degree of acetyl substitution according to the following expression (1):

$$DS=162.14 \times AV \times 0.01/(60.052-42.037 \times AV \times 0.01) \quad (1)$$

In the expression mentioned above, DS represents the total degree of acetyl substitution, and AV represents the degree of acetylation (%). It is common to produce a slight error between the total degree of acetyl substitution obtained by the conversion from the degree of acetylation and the NMR measurement value. In the present specification, the NMR measurement value is adopted for the total degree of acetyl substitution and the degree of substitution at the 6-position of cellulose acetate.

The polydispersity (molecular weight distribution Mw/Mn obtained by dividing the weight-average molecular weight Mw by the number-average molecular weight Mn) of cellulose acetate is not particularly limited and is preferably more than 3.0 and not more than 7.5. In the case where the polydispersity Mw/Mn is not more than 3.0, molecular size is physically too uniform; thus fracture elongation is more likely to be reduced. In the case where the polydispersity Mw/Mn is more than 7.5, many unreacted products exist; thus fracture elongation is more likely to be reduced. Alternatively, in the case where the polydispersity Mw/Mn of cellulose acetate is not more than 3.0 or is more than 7.5, there is a tendency that conductivity is reduced when a resin composition is prepared by mixing with a carbon material, and the resin composition is more likely to be fragile. The weight-average molecular weight Mw and the polydispersity Mw/Mn of cellulose acetate can be adjusted to desired preferred ranges by mixing a plurality of cellulose acetates differing in average molecular weight and polydispersity.

The weight-average molecular weight Mw of the aliphatic cellulose ester (A) such as cellulose acetate is not particularly limited and is usually 100,000 to 300,000, preferably 130,000 to 250,000, more preferably 150,000 to 235,000. If the weight-average molecular weight Mw is too low, viscosity is more likely to be reduced, and there is a tendency that fracture elongation is reduced. Alternatively, if the weight-average molecular weight Mw is too high, filterability is more likely to be poor.

The number-average molecular weight (Mn), the weight-average molecular weight (Mw), and the polydispersity (Mw/Mn) of the aliphatic cellulose ester (A) such as cellulose acetate can be determined by known methods using high-performance liquid chromatography.

The half height width of acetylation distribution of cellulose acetate is not particularly limited and is preferably 1.0 to 2.3 (degree of acetylation (%)). In the case where the half height width of acetylation distribution is smaller than 1.0 or in the case where the half height width of acetylation distribution is larger than 2.3, fracture elongation is more likely to be reduced. In the case where the half height width of acetylation distribution of cellulose acetate is smaller than 1.0 or is larger than 2.3, there is a tendency that conductivity is reduced when a resin composition is prepared by mixing with a carbon material, and the resin composition is more likely to be fragile. The half height width of acetylation distribution of cellulose acetate is more preferably 1.5 to 2.3, particularly preferably 1.9 to 2.3.

Cellulose acetate (particularly, cellulose diacetate) having a uniform total degree of acetyl substitution is preferred as the cellulose acetate. The magnification of the half height width of the maximum peak in an intermolecular substitution distribution curve or an acetylation distribution curve of cellulose acetate can be used as an index for evaluating the uniformity of the total degree of acetyl substitution. The "half height width" refers to a width of a chart at a height half the peak height in the chart, when the chart is plotted with the abscissa (X-axis) depicting the degree of acetylation (degree of substitution) and the ordinate (Y-axis) depicting an abundance at this degree of acetylation (degree of substitution), and serves as an index that indicates how the distribution disperses.

The half height width of substitution distribution can be determined by high-performance liquid chromatography (HPLC) analysis. Specifically, the half height width of compositional distribution of cellulose acetate can be determined by: using a plurality of cellulose acetates differing in the degree of substitution as standard samples to conduct HPLC analysis in a predetermined measurement apparatus under predetermined measurement conditions; and preparing a calibration curve [curve, usually, a quadric curve (particularly, a parabola) that indicates the relationship between the abundance of a cellulose ester and the degree of substitution (degree of acetylation)] from the analysis values of these standard samples.

More specifically, the half height width of substitution distribution can be obtained by converting the abscissa (elution time) of an HPLC (reverse-phase HPLC) elution curve of cellulose acetate measured under predetermined process conditions into the degree of substitution (0 to 3).

For example, a method described in Japanese Patent Laid-Open No. 2003-201301 (paragraphs [0037] to [0040]) can be used as the method for converting the elution time into the degree of substitution. For example, for converting the elution curve into a substitution (intermolecular substitution) distribution curve, elution times may be measured under the same measurement conditions using a plurality of (e.g., not less than four) samples differing in the degree of substitution to obtain a conversion equation according to which the degree of substitution (DS) is determined from the elution time (T). Specifically, the function of a calibration curve (usually, the quadratic expression (2) given below) is determined by the least squares method from the relationship between the elution time (T) and the degree of substitution (DS).

$$DS = aT^2 + bT + c \qquad (2)$$

wherein DS represents the degree of ester substitution; T represents the elution time; and a, b, and c each represent a coefficient of the conversion equation.

Then, in relation to the maximum peak (E) corresponding to the average degree of substitution found in the substitution distribution curve (substitution distribution curve of cellulose acetate plotted with the ordinate depicting the abundance of cellulose acetate and the abscissa depicting the degree of substitution) determined according to the conversion equation as mentioned above, the half height width of substitution distribution is determined as follows: a base line (A-B) tangent to the base point (A) at the lower degree of substitution and to the base point (B) at the higher degree of substitution of the peak (E) is drawn, and a line perpendicular to the abscissa is drawn from the maximum peak (E) with respect to this base line. The intersection (C) between the perpendicular line and the base line (A-B) is determined to determine the midpoint (D) between the maximum peak (E) and the intersection (C). A line parallel to the base line (A-B) is drawn through the midpoint (D) to determine two intersections (A, B) with the intermolecular substitution distribution curve. From each of these two intersections (A, B), a line perpendicular to the abscissa is drawn, and the width between the two intersections on the abscissa is defined as the half height width of the maximum peak.

Such a half height width of substitution distribution reflects that the chains of cellulose acetate molecules in a sample differ in retention time depending on the degree of esterification of hydroxyl groups on the glucose ring in each of the polymer chains constituting these molecules. Thus, ideally, the width of the retention time indicates the width of compositional distribution (in terms of the degree of substitution). However, a high-performance liquid chromatograph has ducts (e.g., a guide column for protecting the column) that do not contribute to the partition. Hence, the width of the retention time that is not ascribable to the width of compositional distribution is often incorporated as an error due to the configuration of the measurement apparatus. This error is influenced by the length and inner diameter of the column, the length and routing from the column to a detector, etc., and differs depending on the configuration of the apparatus, as mentioned above.

For these reasons, the half height width of substitution distribution of the cellulose acetate can usually be determined as a corrected value Z according to the compensation formula (3) given below. By use of such a compensation formula, a more accurate half height width of substitution distribution can be determined as a (substantially) constant value even in different measurement apparatuses (and measurement conditions).

$$Z = (X^2 - Y^2)^{1/2} \qquad (3)$$

wherein X represents the half height width of substitution distribution (uncorrected value) determined in a predetermined measurement apparatus under predetermined measurement conditions, and Y represents the half height width of substitution distribution of cellulose acetate having a total degree of substitution of 3, determined in the same measurement apparatus under the same measurement conditions as in X.

In the expression mentioned above, the "cellulose acetate having a total degree of substitution of 3" refers to a cellulose ester in which all hydroxyl groups of cellulose are esterified (acetylated) (e.g., for cellulose triacetate, the term refers to cellulose triacetate having a degree of acetylation of 62.5%), and corresponds to a non-deacylated fully substituted form obtained after acylation of cellulose and before ripening. In fact (or ideally), the "cellulose acetate having a total degree of substitution of 3" is a cellulose ester having no half height width of substitution distribution (i.e., a half height width of substitution distribution of 0).

As mentioned above, the intermolecular substitution distribution curve of cellulose acetate can be obtained by obtaining a reverse-phase HPLC elution curve of cellulose acetate and converting the abscissa (elution time) of the elution curve into the total degree of acetyl substitution (0 to 3). Likewise, the acetylation distribution curve can also be obtained from the reverse-phase HPLC elution curve of cellulose acetate, and the half height width of acetylation distribution can be obtained therefrom in the same way as in the half height width of substitution distribution.

The viscosity-average degree of polymerization of cellulose acetate is not particularly limited and is usually 100 to 250, preferably 120 to 230. If the viscosity-average degree of polymerization is too small, fracture elongation is more likely to be reduced. If the viscosity-average degree of polymerization is too large, filterability is more likely to be poor.

The viscosity-average degree of polymerization can be measured by the intrinsic viscosity method of Uda et al. (Kazuo Uda and Hideo Saito, Journal of the Society of Fiber Science and Technology, Japan, Vol. 18, No. 1, p. 105-120 (1962)). A solvent can be selected according to the degree of substitution or the like of cellulose acetate (cellulose diacetate, etc.). For example, cellulose acetate is dissolved in a mixed solution of methylene chloride/methanol=9/1 (weight ratio) to prepare a solution having a predetermined concentration c (2.00 g/L), and this solution is injected into an Ostwald viscometer in which the flow time t (sec) of the solution through between the graduations of the viscometer at 25° C. is then measured. Meanwhile, the flow time to (sec) of the mixed solvent alone is also measured in the same way as above, and the viscosity-average degree of polymerization can be calculated according to the following expressions (4) to (6):

$$\eta_{rel}=t/t_0 \quad (4)$$

$$[\eta]=(\ln \eta_{rel})/c \quad (5)$$

$$DP=[\eta]/(6\times 10^{-4}) \quad (6)$$

wherein t represents the flow time (sec) of the solution; $t_0$ represents the flow time (sec) of the solvent; c represents the cellulose acetate concentration (g/L) of the solution; $\eta_{rel}$ represents relative viscosity; [η] represents intrinsic viscosity; and DP represents the average degree of polymerization.

The 6% viscosity of cellulose acetate is not particularly limited and is usually 20 to 400 mPa·s, preferably 40 to 250 mPa·s. If the 6% viscosity is too high, filterability may be poor, and molecular weight distribution is more likely to be difficult to keep at a high level.

The 6% viscosity of cellulose acetate can be measured by the following method:

An Erlenmeyer flask is charged with 3.00 g of a dried sample and 39.90 g of a 95% aqueous acetone solution and tightly stopped, followed by stirring for approximately 1.5 hours. Then, the sample is completely dissolved by shaking for approximately 1 hour in a rotary shaker. The resulting 6 wt/vol % solution is transferred to a predetermined Ostwald viscometer up to the marker line, and the temperature of the solution is regulated at 25±1° C. for approximately 15 minutes. The flow time of the solution through between the time-marker lines is measured, and the 6% viscosity is calculated according to the following expression (7):

$$6\% \text{ Viscosity (mPa·s)}=\text{Flow time (s)} \times \text{Viscometer coefficient} \quad (7)$$

The viscometer coefficient is determined by measuring the flow time of a standard solution for viscometer calibration [manufactured by Showa Shell Sekiyu K.K., trade name "JS-200" (in accordance with JIS Z 8809)] by the same procedures as above and calculating the viscometer coefficient according to the following expression (8):

$$\text{Viscometer coefficient}=\{\text{Absolute viscosity of the standard solution (mPa·s)} \times \text{Density of the solution } (0.827 \text{ g/cm}^3)\}/\{\text{Density of the standard solution } (\text{g/cm}^3) \times \text{Flow time of the standard solution (s)}\} \quad (8)$$

[Production of Aliphatic Cellulose Ester (A)]

The aliphatic cellulose ester (A) can be produced by a known method. Alternatively, a commercially available product may be used. Hereinafter, a method for producing cellulose acetate (particularly, cellulose diacetate) as a typical example of the aliphatic cellulose ester will be described.

Cellulose acetate such as cellulose diacetate can be produced by, for example, (A) an activation step (pretreatment step), (B) an acetylation step, (C) an acetylation reaction termination step, (D) a ripening step (hydrolysis step), (E) a ripening reaction termination step, and (F) a fractionation step.

[Raw Material Cellulose]

Various cellulose sources including wood pulps (softwood pulps and hardwood pulps) and linter pulps (cotton linter pulps, etc.) can be used as the raw material cellulose. These pulps usually contain exotic components such as hemicellulose. Thus, in the present specification, the term "cellulose" used means celluloses also including exotic components such as hemicellulose. At least one selected from hardwood pulps and softwood pulps can be used as a wood pulp, or a hardwood pulp and a softwood pulp may be used in combination. Also, a wood pulp may be used in combination with a linter pulp (e.g., a purified cotton linter). In the present invention, cellulose having a high degree of polymerization, for example, a linter pulp, particularly, a cotton linter pulp, can be used, and it is preferred to use a cellulose constituted at least partially by a linter pulp as the cellulose according to the present invention. The α-cellulose content (by weight), which serves as an index for the degree of crystallinity of cellulose, is not less than 98% (on the order of, e.g., 98.5 to 100%, preferably 99 to 100%, more preferably 99.5 to 100%). The cellulose may usually be one containing a certain amount of carboxyl groups in a state bound with cellulose and/or hemicellulose molecules, for example.

[(A) Activation Step]

In the activation step (or pretreatment step), cellulose is treated with an acetylation solvent (solvent for the acetylation step) to activate the cellulose. Although acetic acid is usually used as the acetylation solvent, a solvent other than acetic acid (methylene chloride, etc.) may be used, or a mixed solvent of acetic acid and a solvent other than acetic acid (methylene chloride, etc.) may be used. Since the raw material cellulose is often supplied in the form of a sheet, the cellulose is cracked in a dry process and then subjected to the activation treatment (or pretreatment).

The time of the activation step (treatment time) is, for example, at least not less than 10 hr (600 minutes), preferably not less than 20 hr, more preferably not less than 50 hr, even more preferably approximately 60 hr. In the case where the time of the activation step is much longer than 60 hr (e.g., 100 hr), it is more likely that the desired molecular weight (degree of polymerization) is difficult to obtain, resulting in reduced production efficiency. Alternatively, in the case where the activation step is performed for less than 10 hr, it is more likely that molecular weight distribution is not broadened even if the esterification step (acetylation step) as the subsequent step is optimized, resulting in reduced fracture elongation. The longer time (at least 10 hr) of the pretreatment (activation step) is effective for reducing the degree of polymerization (molecular weight) of cellulose before acetylation reaction. The acetylation time for attaining the intended degree of polymerization (viscosity) of cellulose acetate can be shortened by use of cellulose having a low degree of polymerization. Since the polydispersity is narrowed with progress in uniform depolymerization in the acetylation reaction, cellulose acetate having a broader polydispersity than that obtained by ordinary methods can be obtained by preparing the cellulose acetate having the intended degree of polymerization (viscosity) through short-time acetylation reaction using cellulose pretreated for a longer time as a raw material.

The amount of the acetylation solvent used in the activation step is on the order of, for example, 10 to 100 parts by weight, preferably 15 to 60 parts by weight, with respect to 100 parts by weight of the raw material cellulose. The temperature in the activation step is in the range of, for example, 10 to 40° C., preferably 15 to 35° C.

[(B) Acetylation Step]

The cellulose activated by the activation treatment can be used to form cellulose acetate (particularly, cellulose triacetate) acetylated with an acetylating agent in the presence of an acetylation catalyst in an acetylation solvent. The activated cellulose to be subjected to the acetylation step may be a mixture in which pulps pretreated under different conditions are blended. The polydispersity of finally obtained cellulose diacetate can be broadened by use of the mixture.

A strong acid, particularly, sulfuric acid, can be used as the acetylation catalyst. The amount of the acetylation catalyst (particularly, sulfuric acid) used in the acetylation step can be on the order of 1 to 20 parts by weight with respect to 100 parts by weight of the raw material cellulose, in terms of the total sum of the amounts including the amount of the acetylation catalyst used in the activation step, and is on the order of 7 to 15 parts by weight (e.g., 7 to 14 parts by weight, preferably 8 to 14 parts by weight, more preferably 9 to 14 parts by weight), particularly, when the acetylation catalyst is sulfuric acid.

Although the acetylating agent may be an acetyl halide such as acetyl chloride, acetic anhydride is usually used. The amount of the acetylating agent used in the acetylation step is on the order of, for example, 1.1 to 4 equivalents, preferably 1.1 to 2 equivalents, more preferably 1.3 to 1.8 equivalents, with respect to hydroxy groups of the cellulose. Also, the amount of the acetylating agent used is, for example, 200 to 400 parts by weight, preferably 230 to 350 parts by weight, with respect to 100 parts by weight of the raw material cellulose.

As mentioned above, acetic acid, methylene chloride, or the like is used as the acetylation solvent. Not less than two solvents (e.g., acetic acid and methylene chloride) may be used as a mixture. The amount of the acetylation solvent used is on the order of, for example, 50 to 700 parts by weight, preferably 100 to 600 parts by weight, more preferably 200 to 500 parts by weight, with respect to 100 parts by weight of the cellulose. Particularly, in the case of obtaining cellulose triacetate, the amount of acetic acid used as the acetylation solvent in the acetylation step is on the order of 30 to 500 parts by weight, preferably 80 to 450 parts by weight, more preferably 150 to 400 parts by weight (e.g., 250 to 380 parts by weight), with respect to 100 parts by weight of the cellulose.

The acetylation reaction can be carried out under routine conditions, for example, at a temperature on the order of 0 to 55° C., preferably 20 to 50° C., more preferably 30 to 50° C. The initial stage of the acetylation reaction may be carried out at a relatively low temperature [e.g., not more than 10° C. (e.g., 0 to 10° C.)]. The reaction time at such a low temperature may be, for example, not less than 30 minutes (on the order of, e.g., 40 minutes to 5 hours, preferably 60 to 300 minutes) from the start of the acetylation reaction. The acetylation time (total acetylation time) differs depending on the reaction temperature, etc., and is in the range of, for example, 20 minutes to 36 hours, preferably 30 minutes to 20 hours. Reaction at least at a temperature of 30 to 50° C. for approximately 30 minutes to approximately 95 minutes is particularly preferred. The acetylation time is important, and conditions where the acetylation time is not more than 95 minutes are particularly preferred because the 6% viscosity, i.e., the degree of polymerization, of the obtained cellulose acetate is not reduced. The completion (or endpoint) of the acetylation reaction is also the beginning (or start point) of hydrolysis reaction or alcoholysis reaction.

[(C) Acetylation Reaction Termination Step]

After the completion of the acetylation reaction, a reaction terminator is added to the reaction system in order to inactivate (quench) the acetylating agent remaining in the reaction system. At least the acetylating agent (particularly, acid anhydride) is inactivated by this operation. The reaction terminator may be any agent that can inactivate the acetylating agent, and often contains at least water.

The reaction terminator may be constituted by, for example, water and at least one selected from acetylation solvents (acetic acid, etc.), alcohols, and neutralizers. More specifically, examples of the reaction terminator can include water alone, a mixture of water and acetic acid, a mixture of water and an alcohol, a mixture of water and a neutralizer, a mixture of water, acetic acid, and a neutralizer, and a mixture of water, acetic acid, an alcohol, and a neutralizer.

A basic substance, for example, an alkali metal compound (e.g., alkali metal hydroxides such as sodium hydroxide and potassium hydroxide; alkali metal carbonates such as sodium carbonate and potassium carbonate; alkali metal bicarbonates such as sodium bicarbonate; alkali metal carboxylates such as sodium acetate and potassium acetate; and sodium alkoxides such as sodium methoxide and sodium ethoxide) or an alkaline earth metal compound (e.g., alkaline earth metal hydroxides such as magnesium hydroxide and calcium hydroxide; alkaline earth metal carbonates such as magnesium carbonate and calcium carbonate; alkaline earth metal carboxylates such as magnesium acetate and calcium acetate; and alkaline earth metal alkoxides such as magnesium ethoxide) can be used as the neutralizer. Among these neutralizers, an alkaline earth metal compound, particularly, a magnesium compound such as magnesium acetate, is preferred. These neutralizers can be used alone or in combination of not less than two. A portion of the acetylation catalyst (sulfuric acid, etc.) is neutralized by the neutralizer.

The time required for the termination of the acetylation reaction is preferably at least less than 10 minutes, more preferably less than 5 minutes. In the case where the time required for the termination of the acetylation reaction is long, the degree of substitution at the 6-position is more likely to be high, and in this case, fracture elongation is more likely to be reduced because intermolecular hydrogen bonds derived from hydroxy groups bonded to the glucose ring are decreased.

[(D) Ripening Step (Hydrolysis Step)]

After the termination of the acetylation reaction, the formed cellulose acetate [cellulose triacetate; cellulose acetate having a total degree of acetyl substitution of not less than 2.6 (2.6 to 3.0)] can be ripened [hydrolyzed (deacetylated)] in acetic acid to obtain cellulose diacetate having an adjusted total degree of acetyl substitution and substitution distribution. In this reaction, a portion of the acetylation catalyst (particularly, sulfuric acid) used in the acetylation may be neutralized while the remaining acetylation catalyst (particularly, sulfuric acid) may be used as a ripening catalyst, or the whole of the residual acetylation catalyst (particularly, sulfuric acid) may be used as a ripening catalyst without being neutralized. In a preferred embodiment, the cellulose acetate (cellulose triacetate) is ripened [hydrolyzed (deacetylated)] using the residual acetylation catalyst (particularly, sulfuric acid) as a ripening catalyst. In the ripening, a solvent or the like (acetic acid, methylene chloride, water, an alcohol, etc.) may be freshly added, if necessary. Any of the neutralizers listed in the acetylation reaction termination step can be preferably used.

In the ripening step for the production of cellulose diacetate, it is preferred that the cellulose triacetate should be hydrolyzed in a temperature range of 40 to 90° C. in acetic acid in the presence of 0.56 to 8.44 parts by weight of the acetylation catalyst (ripening catalyst; particularly, sulfuric acid) with respect to 100 parts by weight of the cellulose triacetate and not less than 50% by mol and less than 65% by mol of water with respect to the acetic acid.

The amount of water in the ripening step (amount of ripening water) can be set to, for example, not less than 50% by mol and less than 65% by mol with respect to the acetic acid. The presence of not less than 50% by mol and less than 65% by mol of water with respect to the acetic acid is preferred because cellulose diacetate that does not have a high degree of acetyl substitution at the 6-position can be formed. In the case where the abundance of water is not less than 65% by mol, the filterability of the resulting cellulose diacetate is more likely to be reduced. The acetylation catalyst is preferably sulfuric acid. The amount of the acetylation catalyst and the amount of water mentioned above are based on the amounts at the start of the ripening reaction for batch reaction and are based on the charging amounts for continuous reaction.

The amount of acetic acid in the ripening step is on the order of preferably 56 to 1125 parts by weight, more preferably 112 to 844 parts by weight, further preferably 169 to 563 parts by weight, with respect to 100 parts by weight of the cellulose triacetate. Also, the amount of acetic acid in the ripening step is on the order of preferably 100 to 2000 parts by weight, more preferably 200 to 1500 parts by weight, further preferably 300 to 1000 parts by weight, with respect to 100 parts by weight of the cellulose used as a raw material in the acetylation reaction.

The amount of the acetylation catalyst (ripening catalyst; particularly, sulfuric acid) in the ripening step is, for example, 0.56 to 8.44 parts by weight, more preferably 0.56 to 5.63 parts by weight, further preferably 0.56 to 2.81 parts by weight, particularly preferably 1.69 to 2.81 parts by weight, with respect to 100 parts by weight of the cellulose triacetate. Also, the amount is preferably 1 to 15 parts by weight, more preferably 1 to 10 parts by weight, further preferably 1 to 5 parts by weight, particularly preferably 3 to 5 parts by weight, with respect to 100 parts by weight of the cellulose used as a raw material in the acetylation reaction. In the case where the amount of the acetylation catalyst (ripening catalyst) is small, the molecular weight of cellulose acetate may be decreased due to too long a time for hydrolysis. On the other hand, if the amount of the acetylation catalyst (ripening catalyst) is too large, the degree of change in depolymerization rate depending on the ripening temperature is large so that the depolymerization rate is large even at a somewhat low ripening temperature, making it difficult to obtain cellulose diacetate having a large molecular weight.

In the production process of cellulose diacetate, the reaction terminator may be added to the reaction solution after the completion of the acetylation without isolating the cellulose triacetate after the completion of the acetylation, and a portion of the acetylation catalyst can be neutralized by the further addition of the neutralizer while the remaining acetylation catalyst can be used as a hydrolysis catalyst in the ripening step, which is then performed by the addition of water in a predetermined amount. In this case, the aforementioned amounts of the acetylation catalyst, acetic acid, and water with respect to 100 parts by weight of the cellulose triacetate are values indicated on the assumption that the raw material cellulose is thoroughly converted into a fully tri-substituted cellulose triacetate at the completion of the acetylation step. It is preferred that the aforementioned amounts of the acetylation catalyst, acetic acid, and water with respect to 100 parts by weight of the cellulose triacetate should be calculated on the basis of the amount of the raw material cellulose at the start of the acetylation step. These amounts with respect to 100 parts by weight of the raw material cellulose are numerical values (parts by weight) determined by multiplying the amounts of the acetylation catalyst, acetic acid, and water with respect to 100 parts by weight of the cellulose triacetate by 1.777, respectively.

As for the amount of the acetylation catalyst used in the ripening, the amount (by weight) of the acetylation catalyst based on the raw material cellulose is a numerical value determined by subtracting the chemical equivalent of the acetylation catalyst added to the reaction system from the chemical equivalent of the neutralizer added to the reaction system, then multiplying the resulting value by 1 gram equivalent of the acetylation catalyst, and multiplying the resulting value by 1.777 in the same way as above.

As for the amount of water, similarly, the amount (by weight) of water based on the raw material cellulose is a numerical value determined by calculating the total amount of water added to the reaction system before and upon the ripening step, such as water added to the reaction system at the completion of the acetylation step and water added thereto at the start of the ripening, and multiplying the total amount by 1.777.

For acetic acid, the amount (by weight) of acetic acid based on the raw material cellulose is a numerical value determined by adding the amount of acetic acid formed by the hydrolysis of acetic anhydride to the total amount of acetic acid added to the reaction system in the pretreatment (activation step), the acetylation step, and the ripening step, and multiplying the resulting value by 1.777.

The ripening temperature (hydrolysis temperature) is, for example, 40 to 90° C., preferably 50 to 90° C., more preferably 60 to 90° C. (e.g., 65 to 90° C.). If the ripening temperature is too high, it is more likely that the depolymerization rate is high and the molecular weight of cellulose acetate is reduced, albeit depending on the amount of the acetylation catalyst. On the other hand, in the case where the ripening temperature is too low, it is more likely that the reaction rate of the hydrolysis reaction is reduced and productivity is inhibited.

[(E) Ripening Reaction Termination Step]

After the formation of the predetermined cellulose diacetate, the ripening reaction is terminated. Specifically, after the ripening (hydrolysis reaction and deacetylation), the neutralizer (preferably the alkaline earth metal compound, particularly, a calcium compound such as calcium hydroxide) may be added, if necessary. The reaction product (dope containing cellulose diacetate) may be added to a precipitation solvent (water, an aqueous acetic acid solution, etc.), and the resulting cellulose diacetate can be separated and subjected to washing with water or the like to remove free metal components, sulfuric acid components, etc. The neutralizer may be used in the washing with water. These procedures can reduce the formation of insoluble matter or low soluble components (unreacted cellulose, low acetylated cellulose, etc.) while suppressing reduction in the degree of polymerization of the cellulose diacetate.

[(F) Fractionation Step]

The cellulose diacetate obtained by these steps may be purified by fractionation. The half height width of acetylation distribution can be further narrowed by this fractionation. A method described in Japanese Patent Laid-Open No. 09-77801 can be used as a method for the fractionation. The principle is the dissolution of the cellulose diacetate in a good solvent (e.g., methylene chloride) for cellulose acetate having a high degree of acetylation, followed by centrifugation to obtain gelatinous precipitates, which are then washed with a good solvent (e.g., methyl alcohol) for cellulose acetate having a low degree of acetylation to purify only a cellulose diacetate component. In addition to or instead of the centrifugation, microfiltration may be carried out using diatomaceous earth or the like for the purification.

Specifically, the cellulose acetate is subjected to precipitation fractionation or dissolution fractionation in a solvent system having selectivity for each of a highly acetylated component and a low acetylated component. Examples of the solvent having high selective solubility for a highly acetylated component include methylene chlorides such as dichloromethane and chloroform. Examples of the solvent having high selective solubility for a low acetylated component include methanol and acetone/methanol (2/8, weight ratio). Since the highly acetylated component and lowly acetylated component are both involved in the formation of insoluble matter as mentioned above, it is important to remove both of these components for preparing sufficiently soluble cellulose acetate.

The method for producing cellulose acetate is described above in detail, and an aliphatic cellulose ester other than cellulose acetate can be appropriately produced with reference to a known method disclosed in a literature and the aforementioned method.

[Carbon Material (B)]

In the present invention, at least one carbon material (B) selected from the group consisting of a single-walled carbon nanotube, a multi-walled carbon nanotube, single-layer graphene, multi-layer graphene, fullerene, and carbon black is used as a conductive filler in order to impart conductivity to the resin composition. Single-walled and multi-walled carbon nanotubes, single-layer and multi-layer graphenes, fullerene, and carbon black are common in that they are composed of carbon atoms, and can impart high conductivity to the resin composition by mixing with cellulose-based resins. Carbon nanotubes, graphenes, and fullerene are carbon allotropes.

The carbon nanotubes are classified into a single-walled carbon nanotube having a single graphite film (graphene sheet) forming the tube and a multi-walled carbon nanotube having multiple graphite films (graphene sheets) forming the tube. The number of films in the multi-walled carbon nanotube is, for example, 2 to 50, preferably 3 to 30. Each carbon nanotube is not limited by its raw material and production method.

The diameter (outer diameter) of the carbon nanotube is usually 0.5 to 180 nm, preferably 0.7 to 100 nm, more preferably 1 to 50 nm, on average. The length of the carbon nanotube is usually 0.2 µm to 2000 µm, preferably 0.3 µm to 1000 µm, more preferably 0.5 µm to 100 µm, particularly preferably 1 µm to 50 µm, on average. The aspect ratio of the carbon nanotube is preferably not less than 5, more preferably not less than 50.

The graphenes are one-atom thick sheets of $sp^2$-bonded carbon atoms and are classified into single-layer graphene and multi-layer graphene. The number of layers in the multi-layer graphene is on the order of, for example, 2 to 200, preferably 3 to 50. The maximum dimension in the plane direction of each graphene sheet is on the order of, for example, 1 to 100 µm.

Fullerene is a cluster constituted by not less than several tens of carbon atoms. Typical fullerene is $C_{60}$ fullerene.

Carbon black is fine particles of carbon having a diameter on the order of 3 to 500 nm. Carbon black is not limited by its raw material and production method.

In the present invention, the content of the carbon material (B) in the conductive cellulose-based resin composition can be selected within a wide range and is, for example, 0.5 to 80% by weight, preferably 1 to 70% by weight, more preferably 3 to 60% by weight. In the present invention, high conductivity is exhibited even if the content of the carbon material (B) is small. Also, moldability is excellent even if the carbon material (B) is contained in a large amount.

[Production of Conductive Cellulose-Based Resin Composition]

An arbitrary method is adopted for the production of the conductive cellulose-based resin composition of the present invention. Examples thereof include methods of supplying the aliphatic cellulose ester (A), the carbon material (B), a solvent, and optionally, a dispersant and other additives to a general-purpose mixing machine, uniformly mixing the contents, then casting the mixture in the form of a film or a sheet, and drying the film or the sheet. The conductive cellulose-based resin composition of the present invention means a resin composition after the removal of the solvent by drying.

Examples of the mixing machine include Henschel mixers, bead mills, PlastoMill, Banbury mixers, and extruders.

The solvent can be any solvent that dissolves the aliphatic cellulose ester (A), and water or an organic solvent, or a mixture thereof can be used according to the type of the aliphatic cellulose ester.

Examples of the organic solvent include: ketones such as acetone, methyl ethyl ketone, isobutyl ketone, methyl t-butyl ketone, and cyclohexanone; alcohols such as methanol, ethanol, isopropyl alcohol, and butanol; linear or cyclic ethers such as tetrahydrofuran and dioxane; aprotic polar solvents such as N,N-dimethylformamide; halogen-based solvents such as methylene chloride and chloroform; and mixtures thereof.

Among these solvents, a ketone such as acetone is preferred when, for example, cellulose diacetate is used as the aliphatic cellulose ester (A).

The amount of the solvent used can be appropriately selected according to the type and amount of the aliphatic cellulose ester (A), the type and amount of the carbon material (B), etc., and is usually 10 to 3000 parts by weight, preferably 20 to 2000 parts by weight, with respect to 100 parts by weight of the aliphatic cellulose ester (A) and usually 200 to 3000 parts by weight, preferably 300 to 2000 parts by weight, with respect to 100 parts by weight of the carbon material (B).

The dispersant is not particularly limited as long as it enhances the dispersibility of the carbon material (B), and examples thereof include surfactants such as cationic surfactants, anionic surfactants, nonionic surfactants, silicone-based surfactants, and fluorine-based surfactants.

Specific examples of the dispersant include: Solsperse 3000, Solsperse 9000, Solsperse 13000, Solsperse 16000, Solsperse 17000, Solsperse 18000, Solsperse 20000, Solsperse 21000, Solsperse 24000, Solsperse 26000, Solsperse 27000, Solsperse 28000, Solsperse 32000, Solsperse 32500, Solsperse 32550, Solsperse 33500, Solsperse 35100, Solsperse 35200, Solsperse 36000, Solsperse 36600, Solsperse 38500, Solsperse 41000, Solsperse 41090, and Solsperse 20000 (all manufactured by Lubrizol Corp.); DISPARLON 1850, DISPARLON 1860, DISPARLON 2150, DISPARLON 7004, DISPARLON DA-100, DISPARLON DA-234, DISPARLON DA-325, DISPARLON DA-375, DISPARLON DA-705, DISPARLON DA-725, and DISPARLON PW-36 (all manufactured by Kusumoto Chemicals, Ltd.); DISPERBYK 101, DISPERBYK 102, DISPEPRBYK 103, DISPERBYK P104, DISPERBYK P104S, DISPERBYK 220S, DISPERBYK 106, DISPERBYK 108, DISPERBYK 109, DISPERBYK 110, DISPERBYK 111, DISPERBYK 112, DISPERBYK 116, DISPERBYK 140, DISPERBYK 142, DISPERBYK 160, DISPERBYK 161, DISPERBYK 162, DISPERBYK 163, DISPERBYK 164, DISPERBYK 166, DISPERBYK 167, DISPERBYK 168, DISPERBYK 170, DISPERBYK 171, DISPERBYK 174, DISPERBYK 180, DISPERBYK 182, DISPERBYK 183, DISPERBYK 184, DISPERBYK 185, DISPERBYK 2000, DISPERBYK 2001, DISPERBYK 2050, DISPERBYK 2070, DISPERBYK 2095, DISPERBYK 2150, DISPERBYK LPN6919, DISPERBYK 9075, and DISPERBYK 9077 (all manufactured by BYK Japan KK.); and EFKA4008, EFKA4009, EFKA4010, EFKA4015, EFKA4020, EFKA4046, EFKA4047, EFKA4050, EFKA4055, EFKA4060, EFKA4080, EFKA4400, EFKA4401, EFKA4402, EFKA4403, EFKA4406, EFKA4408, EFKA4300, EFKA4330, EFKA4340, EFKA4015, EFKA4800, EFKA5010, EFKA5065, EFKA5066, EFKA5070, EFKA7500, and EFKA7554 (all manufactured by Ciba Specialty Chemicals K.K.). These dispersants can be used alone or in combination of not less than two. A dispersant other than those listed above may be used as the dispersant.

The amount of the dispersant used can be appropriately selected according to the type and amount of the carbon material (B), etc., and is usually 5 to 500 parts by weight, preferably 20 to 200 parts by weight, more preferably 30 to 150 parts by weight, with respect to 100 parts by weight of the carbon material (B).

Each additive other than the dispersant can be any additive that does not impair the conductivity of the resin composition, and examples thereof include resins other than the aliphatic cellulose ester (A), fillers [except for the carbon material (B)], light stabilizers, colorants, fluidity modifiers, antistatic agents, antimicrobial agents, ultraviolet absorbers, antioxidants, lubricants, plasticizers, mold release agents, and flame retardants. The amounts of these additives (additives other than the dispersant) used are each preferably not more than 30% by weight, more preferably not more than 15% by weight, further preferably not more than 5% by weight, in terms of the contents in the conductive cellulose-based resin composition. The total amount of these additives (additives other than the dispersant) added is preferably not more than 30% by weight, more preferably not more than 20% by weight, further preferably not more than 10% by weight, in terms of the contents in the conductive cellulose-based resin composition.

A method of first dispersing the carbon material (B) into the solvent to prepare a dispersion of the carbon material (B), and then adding the aliphatic cellulose ester (A) to the dispersion so that the aliphatic cellulose ester (A) is dissolved in the solvent to obtain a conductive cellulose-based resin composition is preferred for producing the conductive cellulose-based resin composition. According to this method, a conductive cellulose-based resin composition very superior in conductivity can be obtained, probably because aggregates in which a plurality of molecules of the carbon material (B) are gathered are almost uniformly dispersed in a matrix resin made of the aliphatic cellulose ester (A).

Although the reason why the conductive cellulose-based resin composition of the present invention exhibits higher conductivity compared with resin compositions containing other general-purpose resins is not clear, it is considered that the aliphatic cellulose ester (A) and the carbon material (B) have moderate affinity and thus form a dispersed state by which conductivity is easily exhibited.

The volume resistivity of the conductive cellulose-based resin composition thus obtained is usually $10^{-3}$ to 20 Ω·cm, preferably $10^{-3}$ to 1 Ω·cm.

As mentioned above, the conductive cellulose-based resin composition of the present invention exhibits very high conductivity even without the use of a special resin or a third component such as an iron or cobalt component. A molded article (film, sheet, etc.) obtained from the conductive cellulose-based resin composition of the present invention can be used as a general conductive material (conductive film or sheet, etc.) and can also be used in a highly conductive form as an electromagnetic wave cutoff material (electromagnetic wave cutoff film or sheet, etc.).

EXAMPLES

Hereinafter, the present invention will be described in more detail with reference to Examples. However, the present invention is not intended to be limited by these Examples.

Production Example 1

A hardwood prehydrolyzed kraft pulp having an α-cellulose content of 98.4 wt % was cracked into a cotton-like pulp using a disk refiner. 26.8 parts by weight of acetic acid were sprayed onto 100 parts by weight of the cracked pulp (water content: 8%) and well stirred, and the mixture was then left standing for 60 hours for activation as pretreatment (activation step). The activated pulp was added to a mixture composed of 323 parts by weight of acetic acid, 245 parts by weight of acetic anhydride, and 13.1 parts by weight of sulfuric acid, and the temperature of the resulting mixture was adjusted from 5° C. to the highest temperature of 40° C. over 40 minutes, followed by acetylation for 110 minutes. A neutralizer (24% aqueous magnesium acetate solution) was added thereto over 3 minutes such that the amount of sulfuric acid (amount of ripening sulfuric acid) was adjusted to 2.5 parts by weight. After further heating of the reaction bath to 75° C., water was added thereto to adjust the water (ripening water) concentration in the reaction bath to 44 mol %. The ripening water concentration was determined by multiplying the molar ratio of water to acetic acid in the reaction bath by 100 and was indicated in mol %. Then, ripening was carried out at 85° C. for 100 minutes and terminated by the neutralization of sulfuric acid with magnesium acetate to obtain a reaction mixture containing cellulose diacetate. An aqueous solution of dilute acetic acid was added to the obtained reaction mixture to separate the cellulose diacetate, followed by washing with water, drying, and stabilization with calcium hydroxide to obtain cellulose diacetate (see Table 1).

Production Examples 2 to 12 and 14, 15

Conditions for the production of cellulose diacetate are shown in Table 1. Each cellulose diacetate was obtained in the same way as in Production Example 1 under the conditions shown in Table 1.

Production Example 13

A mixture in which the cellulose diacetates obtained in Production Examples 1 and 5 were mixed at a weight ratio of 1:1 was prepared.

The degree of acetylation (%), 6% viscosity (mPa·s), viscosity-average degree of polymerization, degree of substitution at the 6-position, half height width of compositional distribution (degree of acetylation (%)) (=half height width of acetylation distribution (%)), weight-average molecular weight Mw, polydispersity Mw/Mn, and fracture elongation of the cellulose diacetate obtained in each Production Example were measured as mentioned below.

The results are shown in Table 1.

<Degree of Acetylation>

The degree of acetylation of the cellulose diacetate obtained in each Production Example was determined by the method for measuring the degree of acetylation prescribed in ASTM-D-817-91 (Testing methods for cellulose acetate, etc.). Conditions for high-performance liquid chromatography analysis used in the measurement of the degree of acetylation will be shown below.

High-performance liquid chromatography conditions:

Eluent: acetone/water/methanol (4/3/1, volume ratio) with gradient to acetone over 15 minutes Column: PRP-1 (4.1×150 mm) manufactured by Hamilton Company Temperature: 35° C.

Flow rate: 0.8 ml/min

Sample solution: 0.2% acetone solution

Injection volume: 10 μl

Detector: Varian 380-LC (nitrogen gas flow rate: 1.0 mL/min, nebulizer temperature: 40° C., eluent evaporation temperature: 70° C.)

<6% Viscosity>

An Erlenmeyer flask was charged with 3.00 g of a dried sample of the cellulose diacetate obtained in each Production Example and 39.90 g of a 95% aqueous acetone solution and tightly stopped, followed by stirring for approximately 1.5 hours. Then, the sample was completely dissolved by shaking for approximately 1 hour in a rotary shaker. The resulting 6 wt/vol % solution was transferred to a predetermined Ostwald viscometer up to the marker line, and the temperature of the solution was regulated at 25±1° C. for approximately 15 minutes. The flow time of the solution through between the time-marker lines was measured, and the 6% viscosity was calculated according to the expression (7):

$$\text{6\% Viscosity (mPa·s)} = \text{Flow time (s)} \times \text{Viscometer coefficient} \quad (7)$$

The viscometer coefficient was determined by measuring the flow time of a standard solution for viscometer calibration [manufactured by Showa Shell Sekiyu K.K., trade name "JS-200" (in accordance with JIS Z 8809)] by the same procedures as above and calculating the viscometer coefficient according to the expression (8):

$$\text{Viscometer coefficient} = \{\text{Absolute viscosity of the standard solution (mPa·s)} \times \text{Density of the solution (0.827 g/cm}^3\text{)}\}/\{\text{Density of the standard solution (g/cm}^3\text{)} \times \text{Flow time of the standard solution (s)}\} \quad (8)$$

<Viscosity-Average Degree of Polymerization>

The cellulose diacetate obtained in each Production Example was dissolved in a mixed solution of methylene chloride/methanol=9/1 (weight ratio) to prepare a solution having a predetermined concentration c (2.00 g/L), and this solution was injected into an Ostwald viscometer in which the flow time t (sec) of the solution through between the graduations of the viscometer at 25° C. was then measured. Meanwhile, the flow time to (sec) of the mixed solvent alone was also measured in the same way as above, and the viscosity-average degree of polymerization was calculated according to the expressions (4) to (6):

$$\eta_{rel} = t/t_0 \quad (4)$$

$$[\eta] = (\ln \eta_{rel})/c \quad (5)$$

$$DP = [\eta]/(6 \times 10^{-4}) \quad (6)$$

wherein t represents the flow time (sec) of the solution; $t_0$ represents the flow time (sec) of the solvent; c represents the cellulose diacetate concentration (g/L) of the solution; $\eta_{rel}$ represents relative viscosity; [η] represents intrinsic viscosity; and DP represents the average degree of polymerization.

<Degree of Substitution at the 6-Position>

Free hydroxy groups of the cellulose diacetate obtained in each Production Example were propionylated with propionic anhydride in pyridine, the resulting sample was dissolved in deuterated chloroform, and $^{13}$C-NMR spectra thereof were measured. The respective degrees of acetyl substitution at the 2-, 3-, and 6-positions on the glucose ring of the original cellulose diacetate were determined from the abundance ratios between acetyl and propionyl groups at the corresponding positions.

<Half Height Width of Acetylation Distribution (2%)>

The half height width of acetylation distribution (%) of the cellulose diacetate obtained in each Production Example was determined from a half height width in an elution curve obtained in the analysis of the degree of acetylation. Specifically, a calibration curve was prepared in advance as a quadratic function with respect to time using cellulose acetates having average degrees of acetylation on the order of 50%, 52%, 55%, and 60% as to an elution peak time versus an average degree of acetylation. From the elution curve of the sample, elution times at two points that gave a half height to the peak height were determined, and degrees of acetylation corresponding to the elution times at these two points were calculated from the calibration curve. The absolute value of the difference between the obtained degrees of acetylation was defined as the half height width of acetylation distribution (%).

<Weight-Average Molecular Weight Mw, Number-Average Molecular Weight Mn, and Polydispersity (Mw/Mn)>

GPC analysis was conducted under conditions given below to measure Mw and Mn. Mw/Mn was determined from these values. Trade name "Shodex GPC SYSTEM-21H" was used as a GPC apparatus.

Solvent: acetone

Column: Two GMHx1 columns (Tosoh Corp.) with guard columns (Tosoh Corp.)

Flow rate: 0.8 ml/min

Temperature: 29° C.
Sample concentration: 0.25% (wt/vol)
Injection volume: 100 μl
Detection: RI (trade name "RI-71S")
Standard: PMMA (molecular weights: 1890, 6820, 27600, 79500, 207400, 518900, and 772000)

<Fracture Elongation>

The fracture elongation was measured by the following method:

The cellulose diacetate obtained in each Production Example was dissolved in a mixed solvent of methylene chloride:methanol=9:1 (weight ratio) to give a solid content concentration of 15 wt %. This solution was casted onto a glass plate using a bar coater to obtain a film having a thickness of 75 to 85 μm. This film was pulled at a rate of 5 cm/minute at room temperature (approximately 22° C.) using a tensile tester (manufactured by Orientec Co., Ltd., "UCT-5T") and an environment unit (manufactured by Orientec Co., Ltd., "TLF-U3"), and the elongation percentage (%) when the film was ruptured was determined.

TABLE 1

Production conditions and physical properties of cellulose diacetate

| | Pretreatment time (hr) | Highest temperature of acetylation (° C.) | Total acetylation time (min) | Neutralizer addition time (min) | Ripening water (mol %) | Ripening temperature (° C.) | Ripening time (min) | Degree of acetylation (%) |
|---|---|---|---|---|---|---|---|---|
| Production Example 1 | 60 | 40 | 110 | 3 | 44 | 85 | 100 | 55.3 |
| Production Example 2 | 60 | 40 | 100 | 3 | 46 | 85 | 100 | 55.3 |
| Production Example 3 | 60 | 40 | 95 | 3 | 48 | 85 | 100 | 55.2 |
| Production Example 4 | 60 | 40 | 85 | 3 | 56 | 85 | 100 | 55.3 |
| Production Example 5 | 60 | 40 | 55 | 3 | 67 | 85 | 100 | 55.3 |
| Production Example 6 | 60 | 40 | 85 | 3 | 56 | 85 | 85 | 56.5 |
| Production Example 7 | 60 | 40 | 85 | 3 | 56 | 85 | 113 | 53.9 |
| Production Example 8 | 60 | 40 | 90 | 1 | 68 | 80 | 156 | 55.3 |
| Production Example 9 | 60 | 40 | 90 | 20 | 52 | 85 | 100 | 55.3 |
| Production Example 10 | 60 | 40 | 90 | 3 | 56 | 75 | 210 | 55.4 |
| Production Example 11 | 60 | 40 | 85 | 3 | 56 | 85 | 130 | 55.3 |
| Production Example 12 | 1 | 40 | 100 | 3 | 56 | 85 | 100 | 55.3 |
| Production Example 13 | 1:1 (weight ratio) Mixture of Production Examples 1 and 5 | | | | | | | 55.3 |
| Production Example 14 | 60 | 40 | 85 | 3 | 56 | 85 | 72 | 57.5 |
| Production Example 15 | 60 | 40 | 85 | 3 | 56 | 85 | 130 | 52.8 |

| | 6% Viscosity (mPa · s) | Viscosity-average degree of polymerization | Degree of substitution at 6-position | Half height width of compositional distribution (degree of acetylation (%)) | Mw/ 10,000 | Polydispersity Mw/Mn | Fracture elongation (%) |
|---|---|---|---|---|---|---|---|
| Production Example 1 | 60 | 154 | 0.75 | 2.2 | 17.3 | 5.0 | 14 |
| Production Example 2 | 90 | 172 | 0.75 | 2.1 | 19.3 | 5.1 | 17 |
| Production Example 3 | 112 | 181 | 0.74 | 2.1 | 20.3 | 5.0 | 19 |
| Production Example 4 | 150 | 194 | 0.75 | 2.1 | 21.7 | 5.1 | 33 |
| Production Example 5 | 240 | 214 | 0.76 | 2.1 | 24.0 | 5.1 | 18 |
| Production Example 6 | 169 | 199 | 0.78 | 1.9 | 21.7 | 5.1 | 33 |
| Production Example 7 | 132 | 188 | 0.72 | 2.2 | 21.1 | 5.0 | 31 |
| Production Example 8 | 150 | 194 | 0.61 | 2.1 | 21.7 | 5.2 | 19 |
| Production Example 9 | 150 | 194 | 0.91 | 2.0 | 21.7 | 5.3 | 18 |
| Production Example 10 | 150 | 194 | 0.76 | 2.5 | 21.7 | 5.1 | 19 |
| Production Example 11 | 150 | 194 | 0.74 | 3.9 | 21.7 | 5.0 | 16 |

TABLE 1-continued

Production conditions and physical properties of cellulose diacetate

| | | | | | | | |
|---|---|---|---|---|---|---|---|
| Production Example 12 | 150 | 194 | 0.76 | 2.1 | 21.7 | 2.8 | 17 |
| Production Example 13 | 150 | 194 | 0.75 | 2.1 | 21.7 | 8.1 | 19 |
| Production Example 14 | 175 | 200 | 0.80 | 1.8 | 22.9 | 5.2 | 33 |
| Production Example 15 | 111 | 181 | 0.69 | 2.3 | 20.8 | 5.1 | 26 |

Preparation Example 1

A bead mill was charged with 17.5 parts by weight of acetone as a dispersion medium, 2 parts by weight of each carbon nanotube as a conductive material, and 0.15 parts by weight of a dispersant (trade name "Solsperse 24000", manufactured by Lubrizol Corp.), followed by kneading and dispersion to prepare a carbon nanotube dispersion. The following two types of carbon nanotubes were used to prepare two types of dispersions:
carbon nanotube 1: trade name "VGCF-X" manufactured by Showa Denko K.K. with an average outer diameter of 15 nm, an average length of 3 μm, and a purity of 97%, and
carbon nanotube 2: trade name "VGCF-H" manufactured by Showa Denko K.K. with an average outer diameter of 150 nm, an average length of 10 μm, and a purity of 97%

Examples 1 to 15

To the carbon nanotube dispersion (19.65 parts by weight) obtained in Preparation Example 1, the cellulose diacetate obtained in each Production Example was added as a matrix resin in a predetermined amount (38 parts by weight when the carbon nanotube content in the conductive cellulose-based resin composition was 5% by weight), and the mixture was thoroughly stirred at 10 rpm using a stirring apparatus (trade name "Lab Reactor RE162/P", manufactured by IKA). After confirmation that the cellulose diacetate was dissolved, the stirring was terminated, and the obtained mixture was spread over a glass substrate and dried to obtain a conductive cellulose-based resin composition in the form of a film (conductive cellulose-based resin film) (thickness: approximately 70 μm).

The volume resistivity of the obtained conductive cellulose-based resin composition was measured by the four probe method in accordance with JIS K7194. Trade name "Loresta" (model MCP-T610) (manufactured by Mitsubishi Chemical Analytech Co., Ltd.) was used as a measurement apparatus.

The types of the cellulose diacetate and the carbon nanotube used in the preparation of the conductive cellulose-based resin composition, the content (% by weight) of the carbon nanotube in the conductive cellulose-based resin composition, and the measurement value of the volume resistivity ($\Omega \cdot cm$) of the conductive cellulose-based resin composition are shown in Table 2. In the table, the numeric (volume resistivity value) with the mark "*" in the upper right portion represents that the obtained film was slightly fragile and was difficult to neatly separate from the substrate.

Examples 16 and 17

To the carbon nanotube dispersion (19.65 parts by weight) obtained in Preparation Example 1, cellulose acetate propionate (Mn: approximately 75,000, manufactured by Sigma-Aldrich Corp., product No. 330183) for Example 16 or cellulose acetate butyrate (Mn: approximately 65,000, manufactured by Sigma-Aldrich Corp., product No. 180963) for Example 17 used as the aliphatic cellulose ester was added as a matrix resin in a predetermined amount (38 parts by weight when the carbon nanotube content in the conductive cellulose-based resin composition was 5% by weight), and the mixture was thoroughly stirred at 10 rpm using a stirring apparatus (trade name "Lab Reactor RE162/P", manufactured by IKA). After confirmation that the aliphatic cellulose ester was dissolved, the stirring was terminated, and the obtained mixture was spread over a glass substrate and dried to obtain a conductive cellulose-based resin composition in the form of a film (conductive cellulose-based resin film) (thickness: approximately 70 μm).

The types of the aliphatic cellulose ester and the carbon nanotube used in the preparation of the conductive cellulose-based resin composition, the content (% by weight) of the carbon nanotube in the conductive cellulose-based resin composition, and the measurement value of the volume resistivity ($\Omega \cdot cm$) of the conductive cellulose-based resin composition are shown in Table 3.

TABLE 2

Volume resistivity ($\Omega \cdot cm$) of conductive cellulose-based resin composition

| | | Carbon nanotube content in conductive cellulose-based resin composition | | | | | | |
|---|---|---|---|---|---|---|---|---|
| | Cellulose | Carbon nanotube 1 | | | | | Carbon nanotube 2 | |
| | diacetate | 5 wt % | 10 wt % | 20 wt % | 30 wt % | 50 wt % | 10 wt % | 50 wt % |
| Example 1 | Production Example 1 | 12.6 | 0.80 | 0.39 | 0.17 | 0.038 | 6.79 | 0.31 |
| Example 2 | Production Example 2 | 12.5 | 0.85 | 0.42 | 0.17 | 0.039 | 6.80 | 0.31 |
| Example 3 | Production Example 3 | 12.6 | 0.80 | 0.40 | 0.16 | 0.038 | 6.79 | 0.30 |
| Example 4 | Production Example 4 | 13.4 | 0.84 | 0.46 | 0.19 | 0.040 | 6.81 | 0.31 |

TABLE 2-continued

Volume resistivity (Ω · cm) of conductive cellulose-based resin composition

Carbon nanotube content in conductive cellulose-based resin composition

| | Cellulose diacetate | Carbon nanotube 1 | | | | | Carbon nanotube 2 | |
|---|---|---|---|---|---|---|---|---|
| | | 5 wt % | 10 wt % | 20 wt % | 30 wt % | 50 wt % | 10 wt % | 50 wt % |
| Example 5 | Production Example 5 | 12.6 | 0.85 | 0.42 | 0.17 | 0.037 | 6.79 | 0.31 |
| Example 6 | Production Example 6 | 12.6 | 0.86 | 0.40 | 0.18 | 0.038 | 6.80 | 0.32 |
| Example 7 | Production Example 7 | 13.2 | 0.83 | 0.41 | 0.20 | 0.038 | 6.84 | 0.35 |
| Example 8 | Production Example 8 | 31.5 | 3.30* | 1.03* | 0.32* | 0.080* | 16.4 | 0.65* |
| Example 9 | Production Example 9 | 30.5 | 3.04* | 1.05* | 0.30* | 0.079* | 16.6 | 0.60* |
| Example 10 | Production Example 10 | 33.4 | 3.65* | 1.06* | 0.33* | 0.083* | 16.7 | 0.64* |
| Example 11 | Production Example 11 | 34.8 | 4.53* | 1.11* | 0.44* | 0.095* | 18.7 | 0.75* |
| Example 12 | Production Example 12 | 32.3 | 4.22* | 1.08* | 0.43* | 0.088* | 17.0 | 0.72* |
| Example 13 | Production Example 13 | 32.7 | 4.22* | 1.07* | 0.43* | 0.084* | 17.4 | 0.72* |
| Example 14 | Production Example 14 | 34.6 | 4.65 | 1.12 | 0.45 | 0.095 | 18.6 | 0.74 |
| Example 15 | Production Example 15 | 34.8 | 4.53 | 1.11 | 0.47 | 0.090 | 18.9 | 0.74 |

*the obtained film was slightly fragile and was difficult to neatly separate from the substrate.

TABLE 3

Volume resistivity (Ω · cm) of conductive cellulose-based resin composition

| | Aliphatic cellulose ester | Carbon nanotube content in conductive cellulose-based resin composition | | | | | | |
|---|---|---|---|---|---|---|---|---|
| | | Carbon nanotube 1 | | | | | Carbon nanotube 2 | |
| | | 5 wt % | 10 wt % | 20 wt % | 30 wt % | 50 wt % | 10 wt % | 50 wt % |
| Example 16 | Cellulose acetate propionate | 13.0 | 0.82 | 0.39 | 0.18 | 0.045 | 6.90 | 0.32 |
| Example 17 | Cellulose acetate butyrate | 13.2 | 0.85 | 0.43 | 0.19 | 0.048 | 6.93 | 0.35 |

Comparative Examples 1 to 8

A carbon nanotube dispersion prepared in the same way as in Preparation Example 1 (using carbon nanotube 1: trade name "VGCF-X", manufactured by Showa Denko K.K.) was mixed with each general-purpose resin given below as a matrix resin in a predetermined amount as in Example 1 to prepare a conductive resin composition, and its volume resistivity was measured.

Polypropylene (Mw: approximately 190,000, manufactured by Sigma-Aldrich Corp., product No. 427896), polyurethane (manufactured by Sanplatec Co., Ltd., trade name "WEB11034"), polyethylene (manufactured by Sigma-Aldrich Corp., product No. 428078), polycarbonate (manufactured by Sanplatec Co., Ltd., trade name "WEB11033"), polyvinyl chloride (Mw: approximately 43,000, manufactured by Sigma-Aldrich Corp., product No. 389293), polystyrene (Mw: approximately 280,000, manufactured by Sigma-Aldrich Corp., product No. 128427), polyethylene terephthalate (PET) (Mw: approximately 18,000, manufactured by Sigma-Aldrich Corp., product No. 200255), and polymethyl methacrylate (PMMA) (manufactured by Wako Pure Chemical Industries, Ltd., product No. 138-02735) were used as the general-purpose resin. The results are shown in Table 4. The term "impossible to mold" means that the resulting molding had cracks and its volume resistivity was impossible to measure.

The types of the general-purpose resin and the carbon nanotube used in the preparation of the conductive resin composition, the content (% by weight) of the carbon nanotube in the conductive resin composition, and the measurement value of the volume resistivity (Ω·cm) of the conductive resin composition are shown in Table 4.

TABLE 4

Volume resistivity (Ω · cm) of conductive resin composition

| | General-purpose resin | Carbon nanotube content in conductive resin composition | | |
|---|---|---|---|---|
| | | Carbon nanotube 1 | | |
| | | 5 wt % | 10 wt % | 20 wt % |
| Comparative Example 1 | Polypropylene | 200 | 21 | Impossible to mold |

TABLE 4-continued

Volume resistivity (Ω · cm) of conductive resin composition

| | General-purpose resin | Carbon nanotube content in conductive resin composition Carbon nanotube 1 | | |
|---|---|---|---|---|
| | | 5 wt % | 10 wt % | 20 wt % |
| Comparative Example 2 | Polyurethane | 1400 | — | Impossible to mold |
| Comparative Example 3 | Polyethylene | — | 83000 | Impossible to mold |
| Comparative Example 4 | Polycarbonate | 170 | 36 | Impossible to mold |
| Comparative Example 5 | Polyvinyl chloride | — | 940 | Impossible to mold |
| Comparative Example 6 | Polystyrene | — | 15 | Impossible to mold |
| Comparative Example 7 | PET | — | 2200 | Impossible to mold |
| Comparative Example 8 | PMMA | — | 500000 | Impossible to mold |

The invention claimed is:

1. A conductive cellulose-based resin composition comprising (A) a cellulose acetate and (B) at least one carbon material selected from the group consisting of a single-walled carbon nanotube, a multi-walled carbon nanotube, single-layer graphene, multi-layer graphene, fullerene, and carbon black; wherein the content of the carbon material (B) is 10 to 80% by weight of the whole conductive cellulose-based resin composition;

a total degree of acetyl substitution of the cellulose acetate is 2.27 to 2.56; and a volume resistivity of the conductive cellulose-based resin composition is $10^{-3}$ to 20 Ω·cm.

2. The conductive cellulose-based resin composition according to claim 1, wherein the volume resistivity is $10^{-3}$ to 1 Ω·cm.

3. The conductive cellulose-based resin composition according to claim 1, wherein the polydispersity Mw/Mn of cellulose acetate is more than 3.0 and not more than 7.5.

4. The conductive cellulose-based resin composition according to claim 3, wherein the half height width of acetylation distribution of cellulose acetate is 1.0 to 2.3%.

5. The conductive cellulose-based resin composition according to claim 3, wherein the degree of substitution at the 6-position of cellulose acetate is 0.65 to 0.85.

6. The conductive cellulose-based resin composition according to claim 1, wherein the half height width of acetylation distribution of cellulose acetate is 1.0 to 2.3%.

7. The conductive cellulose-based resin composition according to claim 6, wherein the degree of substitution at the 6-position of cellulose acetate is 0.65 to 0.85.

8. The conductive cellulose-based resin composition according to claim 1, wherein the degree of substitution at the 6-position of cellulose acetate is 0.65 to 0.85.

9. The conductive cellulose-based resin composition according to claim 1, wherein the carbon material (B) is a single-walled carbon nanotube and/or a multi-walled carbon nanotube.

10. A molded article formed from a conductive cellulose-based resin composition according to claim 1.

* * * * *